United States Patent [19]
Honobe et al.

[11] Patent Number: 6,099,190
[45] Date of Patent: Aug. 8, 2000

[54] APPARATUS FOR FACILITATING SECURING A COMPONENT TO A STATIONARY BRACKET

[75] Inventors: Kazuyuki Honobe; Hideaki Takahashi; Masahiko Hara; Koji Morita; Toru Kojima, all of Kanagawa, Japan

[73] Assignees: Unisia Jecs Corporation, Atsugi; Nissan Motor Co., Ltd., Yokohama, both of Japan

[21] Appl. No.: 09/012,205

[22] Filed: Jan. 23, 1998

[30] Foreign Application Priority Data

Jan. 23, 1997 [JP] Japan ................................... 9-023085

[51] Int. Cl.[7] ................................................ F16B 1/00
[52] U.S. Cl. ........................... 403/13; 403/221; 248/635; 248/225.11; 248/674
[58] Field of Search ............................ 248/635, 225.11, 248/674, 680; 403/13, 14, 221, 220, 225, 354, 337

[56] References Cited

U.S. PATENT DOCUMENTS

| | | |
|---|---|---|
| 2,208,532 | 7/1940 | Woodward ........................... 248/635 X |
| 4,076,196 | 2/1978 | Levine ....................................... 248/14 |
| 4,348,140 | 9/1982 | Bergholz et al. ..................... 403/408.1 |
| 4,732,519 | 3/1988 | Wagner ...................................... 403/14 |
| 5,181,688 | 1/1993 | Hutchison et al. ...................... 248/680 |
| 5,409,283 | 4/1995 | Ban ......................................... 296/35.1 |
| 5,431,517 | 7/1995 | Hoelle et al. ............................ 411/366 |
| 5,516,243 | 5/1996 | Laube ...................................... 408/239 |
| 5,620,028 | 4/1997 | Johnston et al. .......................... 138/31 |

FOREIGN PATENT DOCUMENTS

| | | |
|---|---|---|
| 7-156771 | 6/1995 | Japan . |
| 294928 | 11/1953 | Switzerland ........................... 248/635 |

*Primary Examiner*—Lynne H. Browne
*Assistant Examiner*—David E. Bochna
*Attorney, Agent, or Firm*—Foley & Lardner

[57] ABSTRACT

An apparatus for facilitating securing a component to a stationary bracket, including a mount recess formed in the component, a mount hole formed in the bracket, a sleeve fixed to the mount recess through an elastic bushing, a bolt extending through the mount hole and engaged in the sleeve, a projection positioned on the sleeve, and a guide provided on the bracket. The projection and the guide cooperate to align a threaded bore of the sleeve with the mount hole of the bracket when the component is mounted to the bracket.

10 Claims, 5 Drawing Sheets

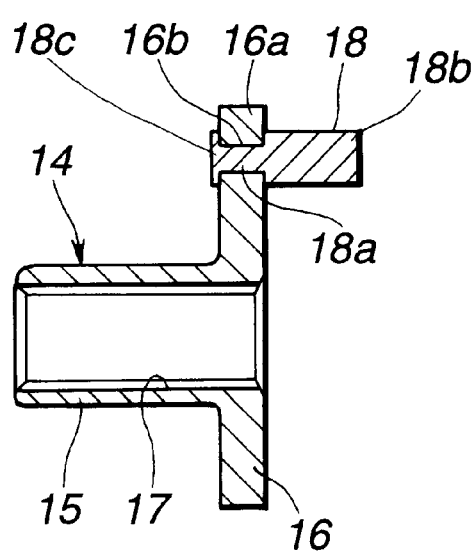
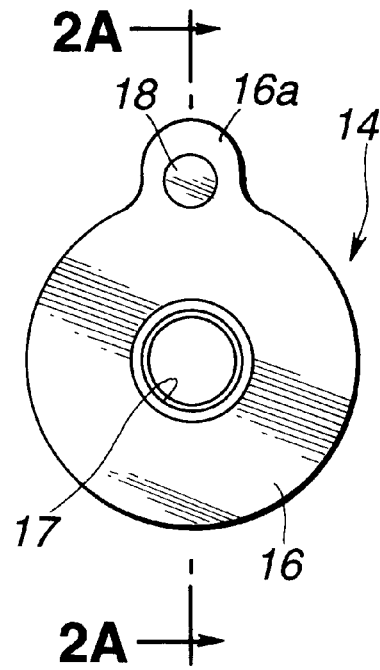
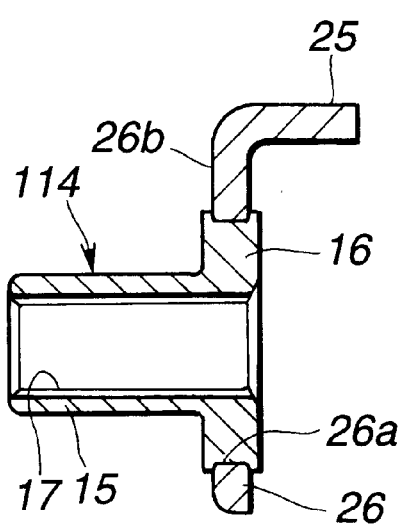
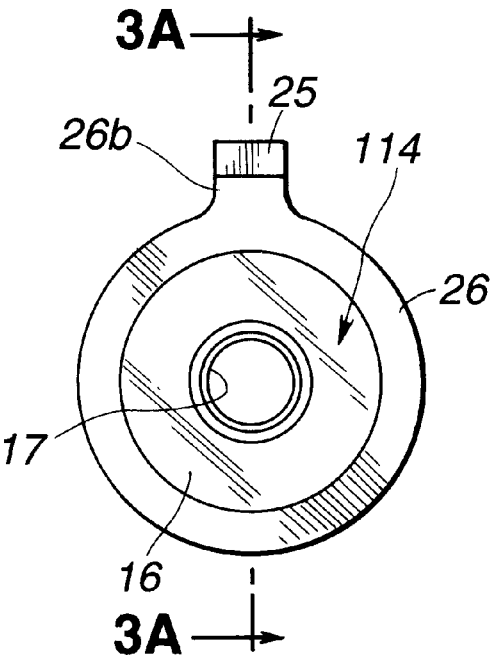

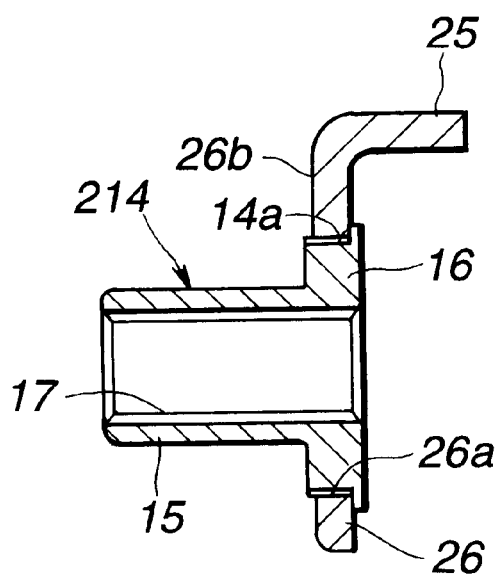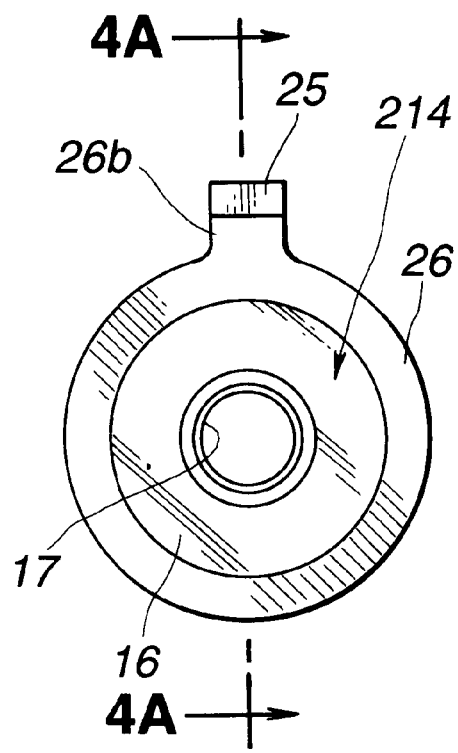

APPARATUS FOR FACILITATING SECURING A COMPONENT TO A STATIONARY BRACKET

The contents of Application No. 9-23085, with a filing date of Jan. 23, 1997 in Japan, are hereby incorporated by reference.

BACKGROUND OF THE INVENTION

1. Field of the Invention

The present invention relates to an apparatus for mounting a component to a stationary bracket, and more specifically to an apparatus for facilitating securing such a component as actuator used in an anti-lock braking system (ABS) for a vehicle, to a bracket fixed to a vehicle body.

2. Description of the Related Art

A vehicle anti-lock braking system for controlling wheel-locking on braking is well known. One example of the anti-lock braking system includes a master cylinder producing brake fluid pressure depending on a foot-operation of a brake pedal, a main passage transmitting the brake fluid pressure to a wheel cylinder, a normally-open type pressure-intensifying electromagnetic valve disposed within the main passage, a return passage communicating the wheel cylinder with a reservoir, a normally-closed type pressure-reducing electromagnetic valve disposed within the return passage, and a pump sucking the brake fluid stored in the reservoir and feeding back the brake fluid to the master cylinder.

These elements, i.e., pressure-intensifying electromagnetic valve, pressure-reducing electromagnetic valve, reservoir, pump and the like, are accommodated in an actuator housing to compose an actuator. The actuator is secured to the vehicle body by means of fastening members.

For instance, there has been proposed an apparatus for securing the actuator to the vehicle body through an elastic support, a mount cover and a bracket. The elastic support is mounted onto a mount shaft integrally formed with the actuator housing and projecting therefrom. The mount cover is fitted onto the elastic support. A threaded shaft integrally formed with the mount cover projects therefrom and extends through the bracket fixed to the vehicle body. A nut is engaged with the threaded shaft projecting outward from a mount hole of the bracket. Japanese Patent Application First Publication No. 7-156771 discloses such a kind of the apparatus as described above.

Since the threaded shaft is integrally formed with the mount cover in the apparatus as proposed, upon mounting to the fixed bracket, the actuator having the elastic support and the mount cover must be inclined relative to the fixed bracket in order to insert the threaded shaft of the mount cover into the mount hole of the fixed bracket. Thus, the actuator is temporarily mounted to the fixed bracket. Then, thus temporarily mounted actuator is secured to the vehicle body by screwing the nut onto a shaft portion of the threaded shaft which projects from the mount hole of the fixed bracket.

In addition, in the apparatus as proposed, there is a clearance between the actuator and the fixed bracket in which the mount shaft, the elastic support and the mount cover are disposed. Therefore, the apparatus as proposed necessitates a relatively large mounting space for mounting the actuator to the vehicle body through the fixed bracket within a limited space, such as an engine room, of the vehicle body.

The present invention contemplates providing an apparatus for securing a component to a stationary bracket, which facilitates an operation of mounting the component to the stationary bracket and desirably saves a mounting space for the component and the bracket within a limited space.

SUMMARY OF THE INVENTION

According to one aspect of the present invention, there is provided, in a structure for securing a component to a stationary bracket through an elastic bushing disposed therebetween and a threaded bolt extending through a mount hole formed in the stationary bracket, the improvement comprising:

a mount recess formed in the component and fitted with the elastic bushing;

a sleeve fitted to the elastic bushing, the sleeve having an axially extending threaded bore engaged with the threaded bolt;

a projection positioned on the sleeve in a radially outward spaced relation to the axis of the sleeve and extending in the axial direction of the sleeve; and a guide guiding the projection of the sleeve, the guide being positioned in the stationary bracket;

the projection and the guide cooperating to align the threaded bore of the sleeve with the mount hole of the stationary bracket when the component is mounted to the stationary bracket.

According to another aspect of the present invention, there is provided an apparatus for facilitating securing a component to a stationary bracket, comprising;

a mount recess formed in the component;

an elastic bushing fitted into the mount recess;

a sleeve fitted into the elastic bushing, the sleeve having an axially extending threaded bore;

a mount hole formed in the stationary bracket;

a bolt extending through the mount hole of the stationary bracket into the sleeve, the bolt having a threaded body engaged with the axially extending threaded bore of the sleeve and a head abutting against the stationary bracket;

a projection positioned on the sleeve in a radially outward spaced relation to the axis of the sleeve and extending in the axial direction of the sleeve; and a guide guiding the projection of the sleeve, the guide being positioned on the stationary bracket;

the projection and the guide cooperating to align the axially extending threaded bore of the sleeve with the mount hole of the stationary bracket when the component is mounted to the stationary bracket.

According to further aspect of the present invention, there is provided a combination, comprising;

a stationary bracket having a mount hole;

a component having a threaded bore;

a bolt extending through the mount hole of the stationary bracket into the threaded bore of the component, the bolt having a threaded body engaged with the threaded bore of the component and a head abutting against the stationary bracket;

a projection positioned on one of the stationary bracket and the component in a radially outward spaced relation to the axis of the bolt and extending in the axial direction of the bolt; and a guide guiding the projection, the guide being positioned on the other of the stationary bracket and the component;

the projection and the guide cooperating to align the threaded bore of the component with the mount hole of

BRIEF DESCRIPTION OF THE DRAWINGS

FIG. 2A is a section of a part of the apparatus, taken along the line 2A—2A of FIG. 2B, showing a sleeve and a pin fixed to the sleeve;

FIG. 2B is a plan view of FIG. 2A;

FIGS. 3A and 3B are views similar to FIGS. 2A and 2B, respectively, but showing the apparatus of a second embodiment according to the present invention;

FIGS. 4A and 4B are views similar to FIG. 2A and 2B, respectively, but showing the apparatus of a third embodiment according to the present invention;

DESCRIPTION OF THE PREFERRED EMBODIMENT

Referring to FIGS. 1A to 8, preferred embodiments of an apparatus for securing a component to a stationary bracket, according to the present invention, are now explained. In the preferred embodiments, the apparatus is applied to a structure of mounting an actuator used in a vehicle anti-lock braking system to a bracket fixed to a vehicle. The actuator accommodates electromagnetic valves, a reservoir, and the like, not shown.

Figure 1A:
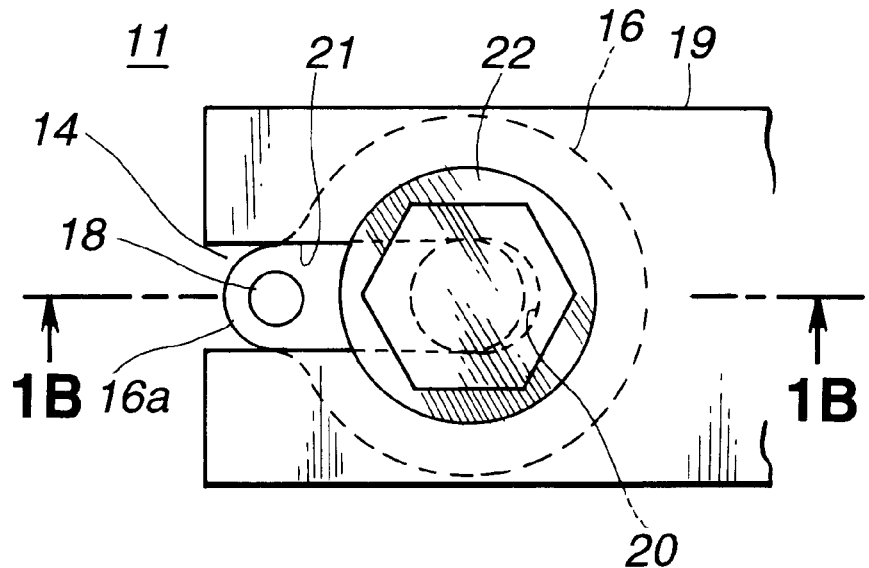
FIG. 1A is a plan view of an apparatus for securing a component to a stationary bracket, of a first embodiment according to the present invention.

FIGS. 1A to 2B illustrate the first embodiment of the invention. As illustrated in FIGS. 1A and 1B, the actuator as the component is indicated at 11. The apparatus includes a cylindrical mount recess 12 formed in a predetermined portion of a housing of the actuator 11. A cylindrical bushing 13 made of an elastic material such as rubber is press-fitted into the mount recess 12 with an interference therewith.

A sleeve 14 is press-fitted into a center opening of the bushing 13. As shown in FIGS. 2A and 2B, the sleeve 14 includes a cylindrical hollow shaft portion 15 and a generally annular flange 16 extending radially outward from the shaft portion 15. The shaft portion 15 has a center axis and an axially extending threaded bore 17 concentrically formed with the center axis and receiving a bolt 22 as explained later. The shaft portion 15 is engaged at an outer circumferential surface thereof with an inner circumferential surface of the bushing 13 which surrounds the center opening. The shaft portion 15 is so designed as to have an outer diameter greater than a diameter of the center opening of the bushing 13 by a predetermined value. The shaft portion 15 is fitted to the bushing 13 with the thus-produced interference therewith. The flange 16 extends substantially perpendicular to the center axis of the shaft portion 15 of the sleeve 14. The flange 16 is interposed between the bushing 13 and a stationary bracket 19 fixed to a vehicle body (not shown). The flange 16 has one end face abutting on a flat end face of the bushing 13 which is exposed to the outside of the mount recess 12, and an opposite end face urged against a rearside face of the bracket 19. The flange 16 is formed with a main portion having substantially same diameter as an outer diameter of the bushing 13, and a projection mount portion 16a extending radially outward from the main portion.

A projection 18 is fixed to the projection mount portion 16a of the flange 16 of the sleeve 14. The projection 18 is positioned on the projection mount portion 16a in a radially outward spaced relation to the center axis of the shaft portion 15 of the sleeve 14. The projection 18 extends in the axial direction of the sleeve 14 through a hole 16b formed in the projection mount portion 16a of the flange 16. The projection 18 is in the form of a headed pin. The pin 18 as the projection has a cylindrical body portion 18a engaged in the hole 16b, a head portion 18b projecting from the hole 16b, and a caulked end 18c engaged with the one end face of the flange 16. Thus, the projection 18 is unitedly coupled with the sleeve 14 to form one unit. The head portion 18b is larger in diameter than the body portion 18a and abuts on the opposite end face of the flange 16. The projection 18 is guided by a guide 21 provided on the stationary bracket 19, when the actuator 11 is moved to the mounting position relative to the stationary bracket 19, as explained later.

The stationary bracket 19 has substantially an elongated rectangular plan view as partly shown in FIG. 1A. The guide 21 is in the form of a slot extending in the longitudinal direction of the stationary bracket 19 and open to a peripheral edge of the stationary bracket 19. The slot 21 as the guide is so configured as to receive the head portion 18b of the projection 18. The slot 21 is defined by two spaced straight guide surfaces substantially parallel to each other. The guide surfaces are opposed to the circumferential surface of the head portion 18b of the projection 18 when the slot 21 guides the projection 18. The stationary bracket 19 is also formed with a mount hole 20 communicating with the slot 21. The mount hole 20 is substantially aligned with the threaded bore 17 of the sleeve 14. The mount hole 20 has a diameter substantially same as the space between the straight guide surfaces of the slot 21.

A bolt 22 extends through the mount hole 20 of the stationary bracket 19 into the threaded bore 17 of the sleeve 14. The bolt 22 has a threaded body engaged with the threaded bore 17 and a head projecting from the mount hole 20 of the stationary bracket 19. The head of the bolt 22 radially extends further than the threaded body does and abuts against the front side face of the stationary bracket 19. The head of the bolt 22 is frictionally engaged with the front side face of the stationary bracket 19 which extends along the periphery of the mount hole 20.

When the actuator 11 is mounted to the stationary bracket 19, the projection 18 and the guide 21 cooperate to align the threaded bore 17 of the sleeve 14 with the mount hole 20 of the stationary bracket 19. Thus, the projection 18 and the guide 21 cooperate to assist the mounting operation of the actuator 11 to the bracket 19.

The mounting operation of the actuator 11 is conducted in such a manner as explained hereinafter.

First, the elastic bushing 13 is press-fitted to the mount recess 12 of the actuator 11. Then, the shaft portion 15 of the sleeve 14 is press-fitted into the center opening of the bushing 13 until the flange 16 of the sleeve 14 abuts on the exposed end face of the bushing 13. In this condition, the actuator 11 and the sleeve 14 connected therewith through the bushing 13 are assembled in one united body.

Figure 1B:
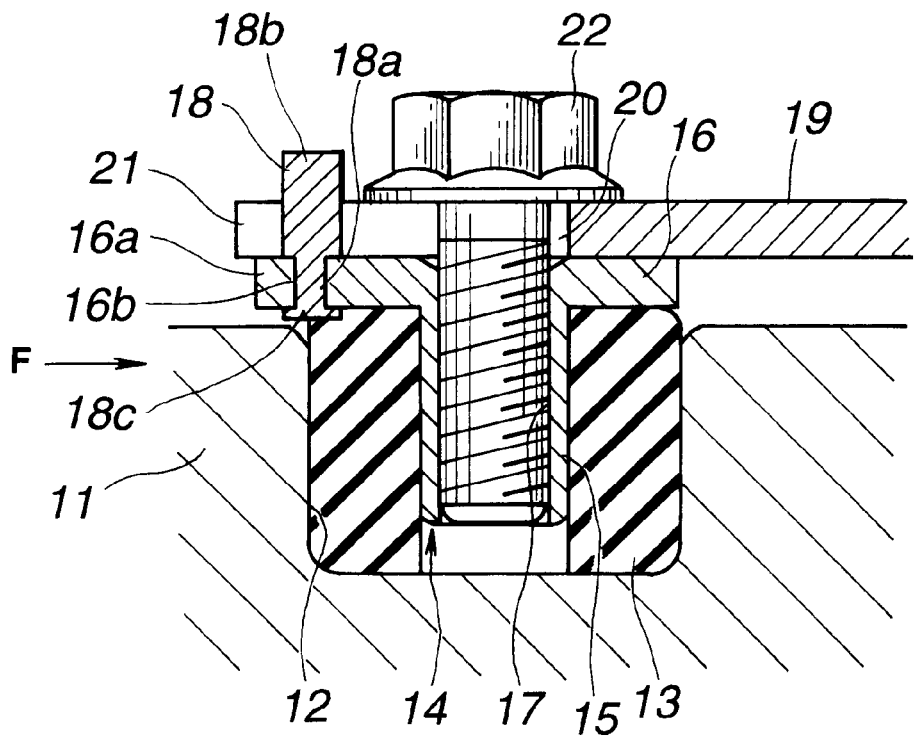
FIG. 1B is a section of the apparatus, taken along the line 1B—1B of FIG. 1A.

Subsequently, the actuator 11 as one united body is moved toward the stationary bracket 19 fixed to the vehicle body. Then, the actuator 11 is moved in a direction F as shown in FIG. 1B such that the pin 18 of the sleeve 14 is inserted into the slot 21 of the stationary bracket 19, while keeping the flange 16 of the sleeve 14 in contact with the rearside face of the bracket 19. The rearside face of the bracket 19 acts as a guide surface for the flange 16 of the sleeve 14. When the actuator 11 is moved to a mounting position as shown in FIGS. 1A and 1B, relative to the bracket 19, the threaded bore 17 of the sleeve 14 is brought into alignment with the mount hole 20 of the bracket 19. During this movement of the actuator 11, the center axis of the threaded bore 17 of the sleeve 14 is displaced parallel to the center axis of the mount hole 20.

In this condition, the bolt 22 is inserted into the mount hole 20 of the bracket 19 and screwed into the threaded bore 17 of the sleeve 14 until the head of the bolt 22 is engaged with the front side face of the bracket 19. When the head of the bolt 22 is engaged with the front side face of the bracket 19, friction engagement therebetween is established as well as meshing engagement of the threaded body of the bolt 22 with the threaded bore 17 of the sleeve 14 is provided. At the same time, there are produced friction engagement of the rearside face of the bracket 19 with the opposite end face of the flange 16 of the sleeve 14 and friction engagement of the one end face of the flange 16 with the exposed end face of the elastic bushing 13. Thus, the actuator 11 is secured to the stationary bracket 19 by the meshing engagement and the friction engagement as discussed above.

With the above-described arrangement of the present invention, the actuator 11 can be readily placed to the mounting position in which the threaded bore 17 of the sleeve 14 is aligned with the mount hole 20 of the stationary bracket 19, without such an inconvenient work as temporary inclination of the actuator 11 relative to the stationary bracket 19. Therefore, the operation of securing the actuator 11 to the stationary bracket 19 through the bolt 22 can be facilitated.

Further, the above-described arrangement that the sleeve 14 is disposed in the mount recess 12 of the actuator 11, serves for reducing the size of the actuator 11 as a whole. This results in saving the mounting space for the actuator 11 and the bracket 19 within a limited space of the vehicle body.

In addition, with the above-described arrangement of the projection 18 and the guide 21, when the bolt 22 is screwed into the sleeve 14, the sleeve 14 can be substantially prevented from rotating about the axis by abutment of the projection 18 against the guide 21. Thus, the bolt 22 is fully tightened up in the sleeve 14. It will be assured that the actuator 11 can be secured to the stationary bracket 19.

Furthermore, when the actuator 11 is moved to the mounting position relative to the stationary bracket 19, the flange 16 of the sleeve 14 can protect the elastic bushing 13 from damage which tends to be caused by interference of the elastic bushing 13 with other components around the stationary bracket 19.

Further, in this embodiment, since the projection 18 is in the form of the pin, it contributes to the simple structure and the size of the pin can be selected in a relatively wide range.

Referring now to FIGS. 3A and 3B, a second embodiment of the apparatus according to the present invention is explained. The second embodiment is similar to the above-discussed first embodiment except that a generally annular disk 26 having a tongue portion 25 as the projection is fixed to the flange 16 of the sleeve 114. Like reference numerals denote like parts and therefore detailed explanations therefor are omitted.

As illustrated in FIGS. 3A and 3B, the generally annular disk 26 is concentrically disposed with the flange 16 of the sleeve 114. The sleeve 114 is configured similar to the sleeve 14 of the first embodiment except the flange 16 is of an annular shape without the projection mount portion 16a. The generally annular disk 26 is engaged on its inner circumferential surface defining a center opening 26a thereof, with the outer periphery of the flange 16. The generally annular disk 26 has a thickness less than that of the flange 16. The generally annular disk 26 is fixed to the sleeve 114 by caulking the outer periphery of the flange 16 of the sleeve 114 after the disk 26 is fitted onto the outer periphery of the flange 16. The generally annular disk 26 has a radially protrudent portion 26b extending radially outward from an outer periphery of the disk 26. The tongue portion 25 as the projection is connected with the radially protrudent portion 26b and extends along the center axis of the sleeve 114. The tongue portion 25 is bent substantially perpendicular to the radially protrudent portion 26b. The tongue portion 25 has such an axial length as to be workable in cooperation with the guide 21 of the stationary bracket 19 when the actuator 11 is mounted to the stationary bracket 19. The tongue portion 25 is of a prismatic shape having two opposed side faces which are spaced in the circumferential direction of the disk 26. The side faces are opposed to the straight guide surfaces of the slot 21 when the tongue portion 25 is guided. The tongue portion 25 is not limited to the prismatic shape but may be formed into various kinds of shapes. The generally annular disk 26 is formed in press work, serving for facilitating the manufacturing process. The generally annular disk 26 has opposed end faces hardened by the press work. The hardened end faces of the disk 26 enhance the strength against the pressing force which is applied thereto through the head of the bolt 22 when the bolt 22 is screwed into the threaded bore 17 of the sleeve 114.

FIGS. 4A and 4B illustrate a third embodiment of the apparatus according to the present invention, which differs from the above-described second embodiment in that the generally annular disk 26 is fixed to the sleeve 214 by serrations 14a formed on the flange 16 of the sleeve 214.

As shown in FIG. 4A, the sleeve 214 has the axially extending serrations 14a formed on the outer peripheral surface of the flange 16. The sleeve 214 is similar to the sleeve 114 of the second embodiment except that the serrations 14a are provided instead of the caulking of the sleeve 114. The generally annular disk 26 is press-fitted onto the flange 16 of the sleeve 214. The serrations 14a of the flange 16 are engaged with the inner circumferential surface surrounding the center opening 26a of the generally annular disk 26. By the engagement, the generally annular disk 26 is prevented from rotating relative to the sleeve 214. Thus, the generally annular disk 26 is firmly fixed to the sleeve 214.

In the second and third embodiments, the sleeve 114, 214 may be formed into a cylindrical hollow shaft without the flange and be fixed at an outer periphery thereof to the inner circumferential surface surrounding the center opening 26a of the generally annular disk 26.

Figure 5:
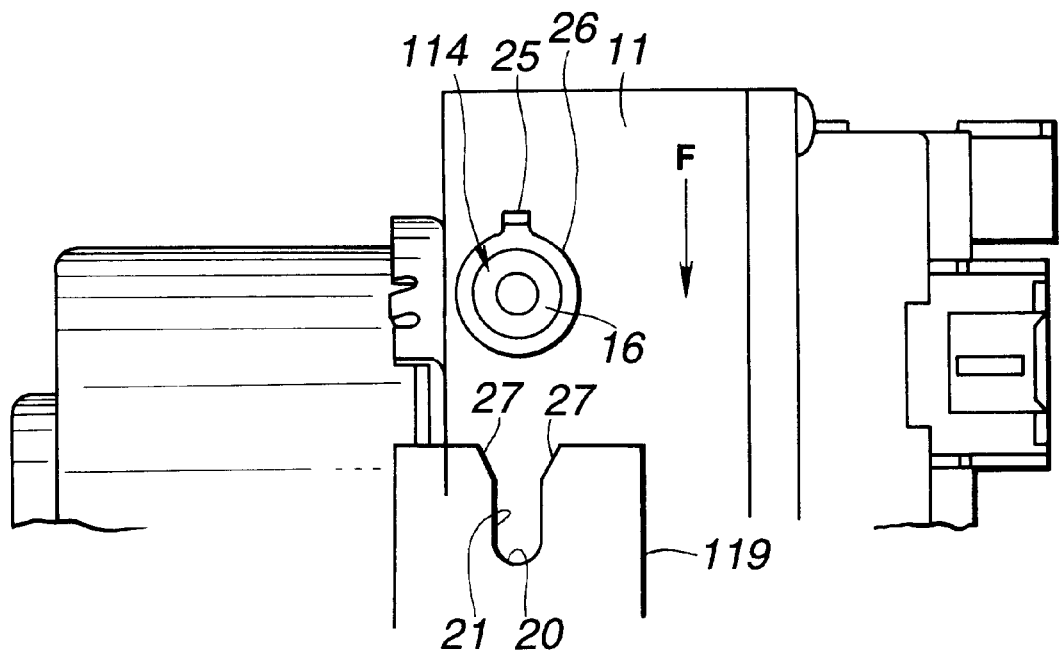
FIG. 5 is a plan view of the apparatus of a fourth embodiment according to the present invention.

Referring now to FIG. 5, a fourth embodiment of the apparatus according to the present invention, is explained, which differs from the above-described second embodiment in that the stationary bracket 119 is formed with two spaced slant guide surfaces 27 at the open end of the slot 21.

As illustrated in FIG. 5, the two spaced slant guide surfaces 27 are continuously connected with the straight guide surfaces of the slot 21 of the stationary bracket 119. The slant guide surfaces 27 are inclined relative to the straight guide surfaces in such a manner that a distance between the slant guide surfaces 27 increases as a distance from the peripheral edge of the stationary bracket 119 decreases. One of the slant guide surfaces 27 can be omitted. The provision of the slant guide surfaces 27 serves for facilitating an operation of guiding the projection 25 of the disk 26 into the slot 21 of the bracket 119 when the actuator 11 is moved in the direction F as shown in FIG. 5. Although, in this embodiment, the projection 25 is in the form of the tongue portion of the disk 26 as explained in the second embodiment, the pin as explained in the first embodiment can be used as the projection.

Figure 6:
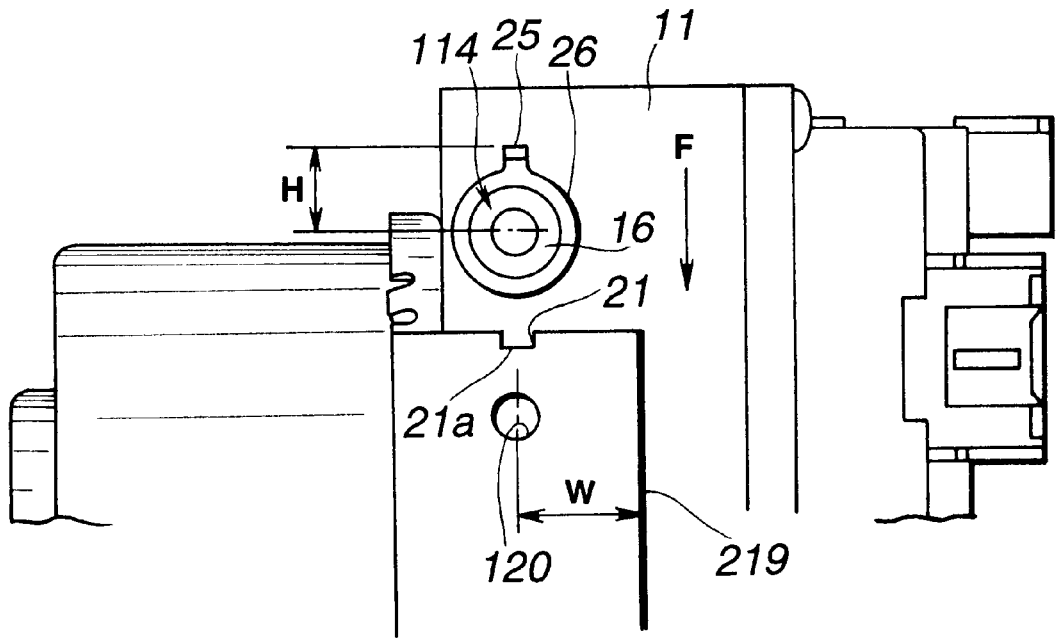
FIG. 6 is a view similar to FIG. 5, but showing the apparatus of a fifth embodiment according to the present invention.

Referring to FIG. 6, a fifth embodiment of the apparatus according to the present invention, is explained. This embodiment is similar to the above-described second embodiment except the configuration of the stationary bracket 219.

As illustrated in FIG. 6, the stationary bracket 219 is formed with the circular mount hole 120 and the slot 21 which are arranged in a spaced relation to each other without interconnecting. The slot 21 is prevented from communicating with the circular mount hole 120. The opposed straight guide surfaces of the slot 21 act as the guide for the projection 25. The stationary bracket 219 has a stop 21a which is engaged with the projection 25 to limit the movement of the actuator 11 in the direction F. The stop 21a is a bottom of the slot 21 and engaged with a radial inside surface of the projection 25 when the actuator 11 is placed in the mounting position. Thus, the guide and the stop are constituted by the slot 21. The stop 21a contributes to accurate positioning of the actuator 11, serving for stably temporarily holding the actuator 11 in the mounting position before tightening of the bolt 22. Further, with the arrangement of the slot 21 prevented from communicating with the mount hole 120, the stationary bracket 219 has a wall portion extending between the slot 21 and the mount hole 120. The wall portion of the bracket 219 shares the pressure applied to the bracket 219 through the head of the bolt 22 tightened, with the peripheral wall portion of the stationary bracket 219 which surrounds the mount hole 120. This causes the pressure to be uniformly borne on the peripheral wall portion of the stationary bracket 219, serving for firmly supporting the actuator 11 on the stationary bracket 219.

Furthermore, the stationary bracket 219 has a width W extending from the center axis of the sleeve 114 to one of the opposed side edges of the bracket 219, which is larger than a radial distance H from the center axis of the sleeve 114 to the radial outer side of the projection 25 of the disk 26. This configuration of the stationary bracket 219 causes misalignment of the threaded bore 17 of the sleeve 114 with the mount hole 120 if the projection 25 is angularly displaced from a predetermined position relative to the center axis of the sleeve 114. Owing to the misalignment, the actuator 11 is restrained from being mounted to the bracket 219 in a position offset from the mounting position in which the projection 25 is engaged with the stop 21a.

Meanwhile, although in this embodiment, the projection 25 is in the form of the tongue portion of the disk 26 as explained in the second embodiment, the pin as explained in the first embodiment can be used as the projection.

Figure 7:
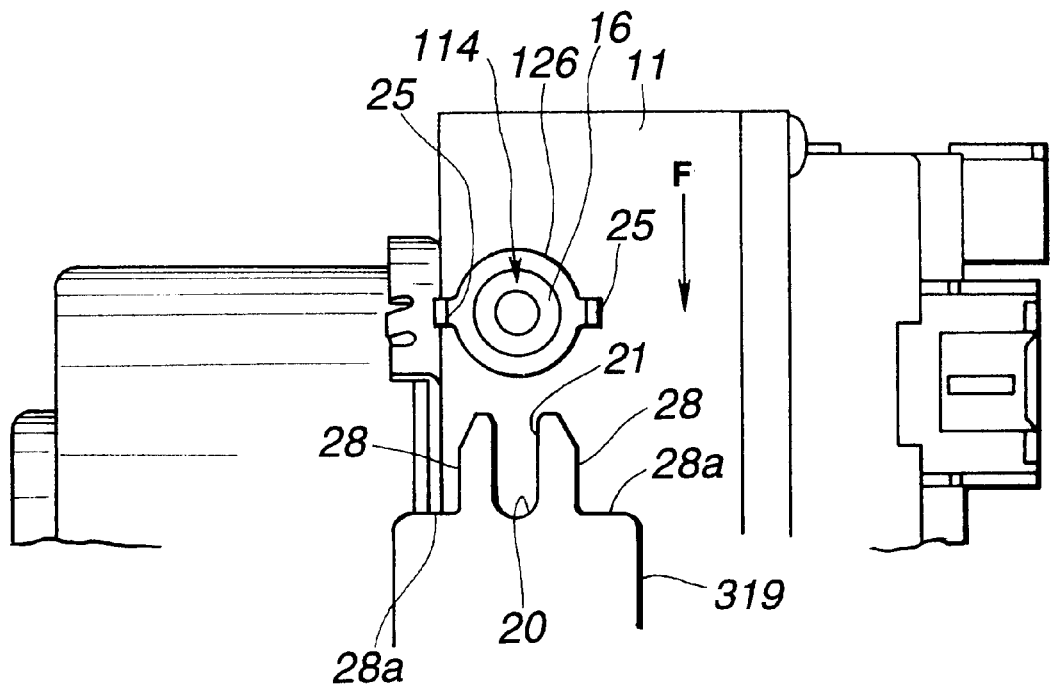
FIG. 7 is a view similar to FIG. 5, but showing the apparatus of a sixth embodiment according to the present invention.

Referring to FIG. 7, there is shown a sixth embodiment of the apparatus according to the present invention. The sixth embodiment is different from the above-described second embodiment in that two opposed projections 25 are provided on the generally annular disk 126 and guides 28 are in the form of shoulder portions of the stationary bracket 319.

As illustrated in FIG. 7, the generally annular disk 126 has the two projections 25 which are in the form of the tongue portions as explained in the second embodiment. The two projections 25 are disposed in substantially diametrically opposed relation to the center axis of the sleeve 114. The generally annular disk 126 is similar to the disk 26 of the second embodiment except the two projections. The two projections 25 each may be in the form of the pin fixed to the flange of the sleeve as explained in the above-described first embodiment.

The stationary bracket 319 has the guides 28 which are in the form of shoulder portions positioned on both sides of the mount hole 20 in a spaced relation to the mount hole 20. The shoulder portions are recessed from the opposed side edges of the bracket 319. The stationary bracket 319 also has stops 28a which are engaged with the projections 25 to limit the movement of the actuator 11 in the direction F. Each pair of the guide 28 and stop 28a are constituted by the shoulder portion. Specifically, the guide 28 is a longitudinal portion of the shoulder portion which extends longitudinally inward from the peripheral edge of the stationary bracket 319. The longitudinal portion of the shoulder portion is opposed to the radial inside surface of each projection 25 when guiding the projection 25. The stop 28a is a lateral portion of the shoulder portion which extends laterally inward from the opposed side edges of the stationary bracket 319 and is connected with the longitudinal portion of the shoulder portion. The lateral portion is engaged with one of two spaced side faces of each projection 25. The stops 28a contribute to accurate positioning of the actuator 11 and then certainly temporarily retain the actuator 11 in the mounting position before tightening of the bolt 22. Further, with the arrangement of the two projections 25 and the corresponding stops 28a, the actuator 11 can be certainly temporarily retained in the mounting position without displacement. This facilitates screwing the bolt 22 into the threaded bore 17 of the sleeve 114.

Figure 8:
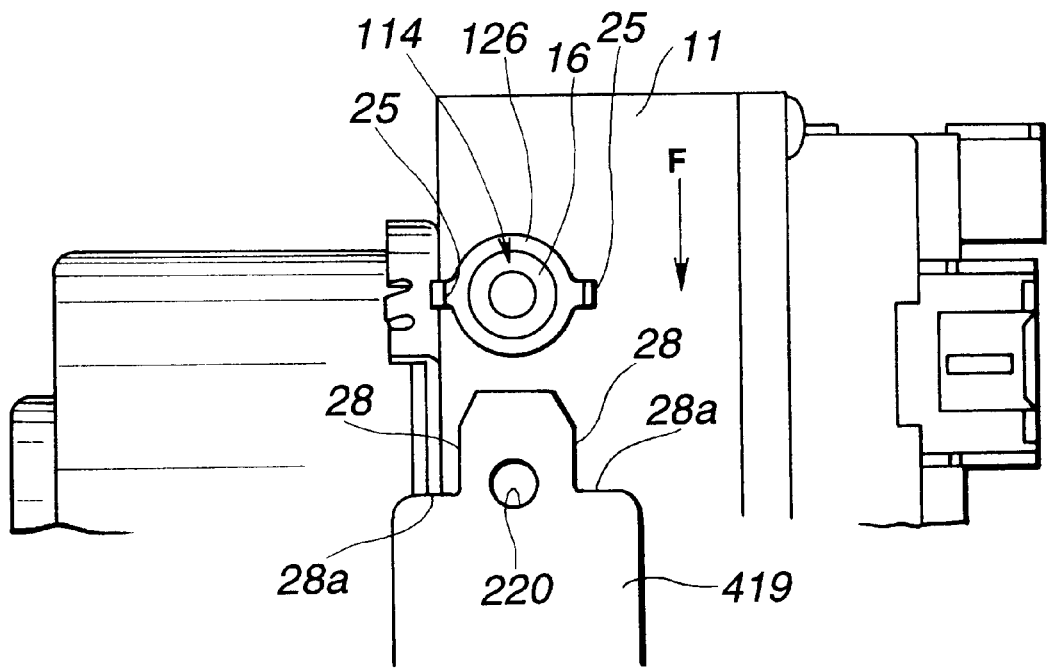
FIG. 8 is a view similar to FIG. 5, but showing the apparatus of a seventh embodiment according to the present invention.

Referring to FIG. 8, a seventh embodiment of the apparatus according to the present invention is now explained. The seventh embodiment is similar to the above-described sixth embodiment except the arrangement of the circular mount hole 220 of the stationary bracket 419.

As illustrated in FIG. 8, the stationary bracket 419 is formed with the circular mount hole 220 prevented from being open to the peripheral edge of the bracket 419. The stationary bracket 419 has a wall portion extending between the mount hole 220 and the peripheral edge of the bracket 419. With this arrangement, the wall portion of the stationary bracket 419 shares the pressure applied through the head of the bolt 22 with the peripheral wall portion of the bracket 419 which surrounds the mount hole 220. This causes the pressure to be uniformly borne on the peripheral wall portion of the stationary bracket 419, serving for firmly supporting the actuator 11 on the bracket 419.

What is claimed is:

1. A structure for securing a component to a vehicle body, comprising:

a stationary bracket having a mount hole formed therein;

an elastic bushing disposed between the component and the stationary bracket and adapted to be fitted within a recess formed in the component;

a threaded bolt extending through the mount hole;

a sleeve fitted to the elastic bushing, said sleeve having an axially extending threaded bore engaged with the threaded bolt;

a projection positioned on the sleeve in a radially outward spaced relation to the axis of the sleeve and extending in the axial direction of the sleeve;

a guide positioned in the stationary bracket, said guide cooperating with the projection to align the threaded bore of the sleeve with the mount hole of the stationary bracket when the component is mounted to the stationary bracket; and a stop engaged with the projection to limit the movement of the component relative to the stationary bracket in one direction, wherein the guide and the stop each comprises shoulder portions positioned on both sides of the mount hole of the stationary bracket in a spaced relation to the mount hole.

2. The structure as claimed in claim 1, further comprising a generally annular disk fixed to a flange of the sleeve and formed with the projection, the projection being in the form of tongue portions extending from the outer periphery of the annular disk and disposed in substantially diametrically opposed relation to the axis of the sleeve.

3. An apparatus for facilitating securing a component to a vehicle body, comprising:

a stationary bracket having a mount hole and a guide positioned on the stationary bracket;

an elastic bushing adapted to be fitted into a mount recess formed in the component;

a sleeve fitted into the elastic bushing, said sleeve having an axially extending threaded bore and a radially outward extending flange interposed between the elastic bushing and the stationary bracket;

a bolt extending through the mount hole of the stationary bracket into the sleeve, said bolt having a threaded body engaged with the axially extending threaded bore of the sleeve and a head abutting against the stationary bracket;

a projection positioned on the sleeve in a radially outward spaced relation to the axis of the sleeve and extending in the axial direction of the sleeve, said projection being guided by the guide and adapted to cooperate with the guide to align the axially extending threaded bore of the sleeve with the mount hole when the component is mounted to the stationary bracket; and a stop engaged with the projection and adapted to limit the movement of the component relative to the stationary bracket in one direction, wherein the guide and the stop each comprises shoulder portions positioned on both sides of the mount hole of the stationary bracket in a spaced relation to the mount hole.

4. The apparatus as claimed in claim 3, further comprising a generally annular disk fixed to the flange of the sleeve and formed with the projection, the projection being in the form of tongue portions extending from the outer periphery of the annular disk and disposed in substantially diametrically opposed relation to the axis of the sleeve.

5. The apparatus as claimed in claim 4, wherein the mount hole is open to a peripheral edge of the stationary bracket.

6. The apparatus as claimed in claim 3, wherein the stationary bracket is adapted for being fixed to the vehicle body.

7. A combination comprising:

a stationary bracket having a mount hole;

a component having a threaded bore and a mount recess;

an elastic bushing fitted into the mount recess of the component;

a sleeve fitted into the elastic bushing, said sleeve defining the threaded bore extending in the axial direction of the sleeve, said sleeve having a radially outward extending flange interposed between the elastic bushing and the stationary bracket; and a bolt extending through the mount hole of the stationary bracket into the threaded bore of the component, said bolt having a threaded body engaged with the threaded bore of the component and a head abutting against the stationary bracket;

a projection positioned on one of the stationary bracket and the component in a radially outward spaced relation to the axis of the bolt and extending in the axial direction of the bolt;

a guide guiding the projection, said guide being positioned on the other of the stationary bracket and the component, said guide cooperating with the projection to align the threaded bore of the sleeve with the mount hole of the stationary bracket when the component is mounted to the stationary bracket; and a stop engaged with the projection to limit the movement of the component relative to the stationary bracket in one direction, wherein the guide and the stop each comprises shoulder portions positioned on both sides of the mount hole of the stationary bracket in a spaced relation to the mount hole.

8. The combination as claimed in claim 7, further comprising a generally annular disk fixed to the flange of the sleeve and formed with the projection, the projection being in the form of tongue portions extending from the outer periphery of the annular disk and disposed in substantially diametrically opposed relation to the axis of the sleeve.

9. The combination as claimed in claim 8, wherein the mount hole is open to a peripheral edge of the stationary bracket.

10. A combination comprising:

a stationary bracket having a mount hole, said stationary bracket being fixed to a vehicle body;

a component having a threaded bore;

a bolt extending through the mount hole of the stationary bracket into the threaded bore of the component, said bolt having a threaded body engaged with the threaded bore of the component and a head abutting against the stationary bracket;

a projection positioned on one of the stationary bracket and the component in a radially outward spaced relation to the axis of the bolt and extending in the axial direction of the bolt; and a guide guiding the projection, said guide being positioned on the other of the stationary bracket and the component, and cooperating with the projection to align the threaded bore of the component with the mount hole of the stationary bracket when the component is mounted to the stationary bracket.

* * * * *